United States Patent [19]

Lee

[11] Patent Number: 5,400,314
[45] Date of Patent: Mar. 21, 1995

[54] OPTICAL PICKUP USING A LAMP

[75] Inventor: Chul-woo Lee, Seoul, Rep. of Korea

[73] Assignee: Samsung Electronics Co., Ltd., Kyungki-do, Rep. of Korea

[21] Appl. No.: 158,213

[22] Filed: Nov. 29, 1993

[30] Foreign Application Priority Data

Nov. 30, 1992 [KR] Rep. of Korea ............... 92-22927

[51] Int. Cl.⁶ ............................................. G11B 7/00
[52] U.S. Cl. ................................ 369/121; 369/108; 369/118; 369/123
[58] Field of Search ............... 369/121, 44.23, 44.21, 369/108, 123, 118, 112

[56] References Cited

U.S. PATENT DOCUMENTS

| | | | |
|---|---|---|---|
| 4,607,359 | 8/1986 | Matsubayashi et al. | 369/121 X |
| 5,014,253 | 5/1991 | Morimoto et al. | 369/121 X |
| 5,245,182 | 9/1993 | Van Rosmalen et al. | 250/236 |
| 5,278,816 | 1/1994 | Russell | 369/112 X |
| 5,311,495 | 5/1994 | Ando | 369/112 |

FOREIGN PATENT DOCUMENTS 405314529 11/1993 Japan ................................. 369/121

*Primary Examiner*—Eugene R. LaRoche
*Assistant Examiner*—Son Dinh
*Attorney, Agent, or Firm*—Leydig, Voit & Mayer

[57] ABSTRACT

An optical pickup for use in various optical recording-/reproducing apparatus includes a general-purpose lamp producing a wide range of light wavelengths, a converging device for converging the light of the lamp, and a pinhole and color filter for enhancing the temporal/spatial coherence of the light. The lamp radiates light containing the intensity of a laser and spectral distribution characteristic of a laser.

7 Claims, 1 Drawing Sheet

OPTICAL PICKUP USING A LAMP

BACKGROUND OF THE INVENTION

The present invention relates to an optical pickup for recording and reproducing information in which light is convergently projected onto an optical recording medium to record information and the light reflected therefrom is photoelectrically converted to reproduce information and, more particularly, to an optical pickup using monochromatic light of a wavelength having excellent temporal/spatial coherence obtained from a general-purpose lamp which radiates light over a wide range of wavelengths, i.e., without employing a laser light source.

In an optical recording medium such as an optical disk, recording density is inversely proportional to the size of a light spot converged on the recording medium from a light source of a recording apparatus (optical pickup) via an objective lens. The diameter of the light spot is generally proportional to the wavelength of the light. However, the diameter of the light spot does not get infinitely smaller. For high-density optical recording, a light source of short wavelength having excellent convergence is being considered.

Generally, in this field, a laser apparatus is chiefly used as the light source. This is because a laser produces short wavelength light with excellent orientation and convergence. Further, lasers are monochromatic and easy to modulate.

However, below the wavelengths of green and blue light, it is difficult to develop a small laser apparatus. A conventional laser apparatus is large, and the driving thereof is complicated. Further, such lasers are very expensive due to low manufacturing yield and the employment of costly fittings and complex additional circuitry.

SUMMARY OF THE INVENTION

Therefore, it is an object of the present invention to provide an optical pickup using a general-purpose lamp which is miniaturized and can be manufactured at low cost while maintaining the advantages of a laser.

To accomplish the object of the present invention, there is provided an optical pickup using a lamp, comprising a light generator, a light emitting portion for convergently directing the light generated by the light generator onto a recording medium according to information, and a light detector for detecting the light reflected from the recording medium so as to output a signal, wherein the light generator comprises a lamp for radiating light, a converging device for converging the light generated by the lamp to a point, a hole plate member having a pinhole for transmitting the light converged to the point, and a color filter located in the front or rear of the hole plate member for selectively transmitting a wavelength of the light passing the pinhole.

In the configuration of the optical pickup for recording and reproducing of the present invention, instead of a conventional laser apparatus, a general-purpose lamp, which irradiates a relatively wide range of wavelengths of light, is used in obtaining light of excellent temporal and spatial coherence. Accordingly, the present invention solves problems in structure and cost due to the use of a laser light source. Further, the present invention enables miniaturization of the apparatus.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Figure 1:
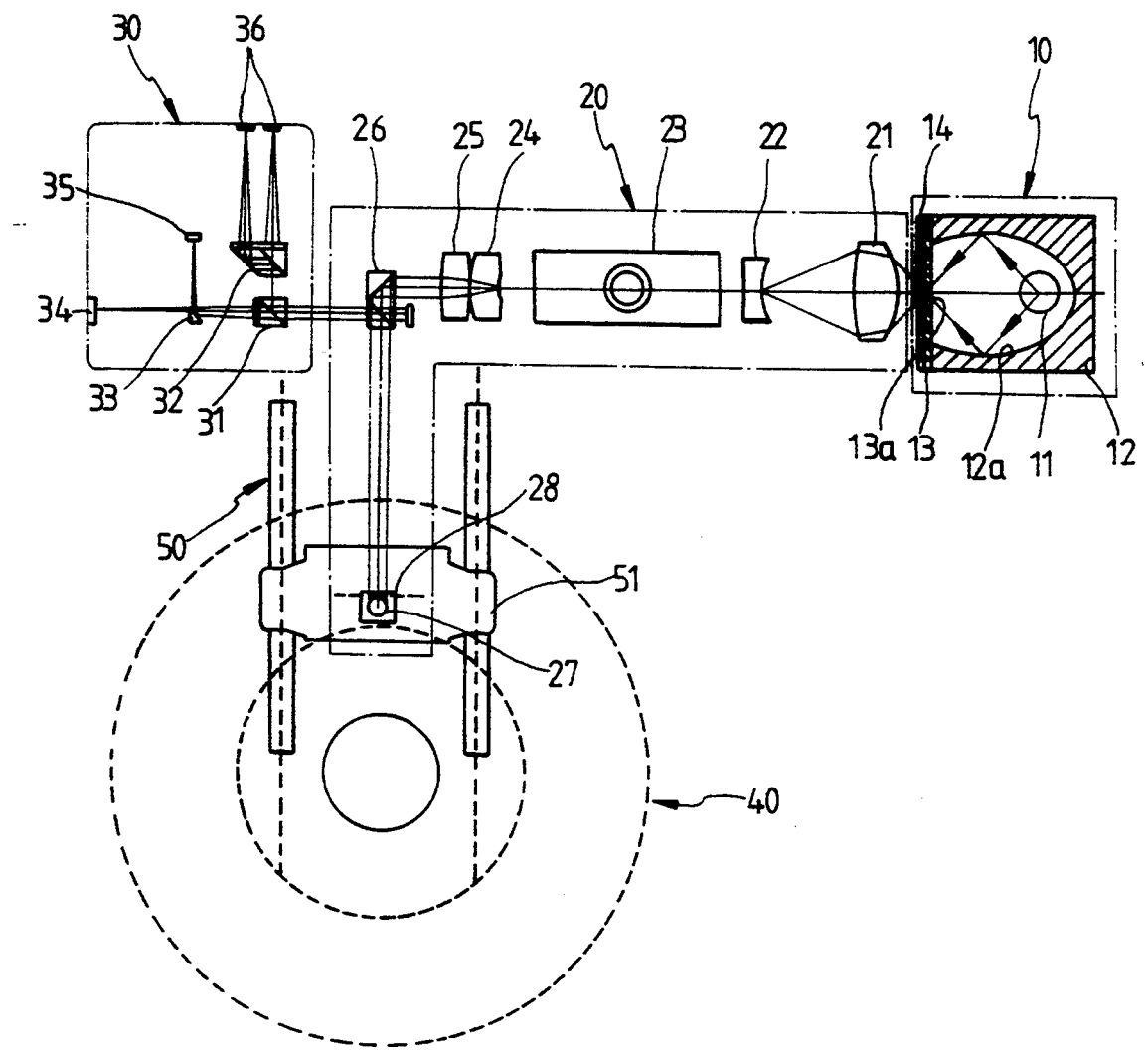
FIG. 1 is plan view of the optical configuration of an optical pickup using a lamp according to the present invention.

FIG. 1 shows the entire configuration of an optical pickup of the present invention which is used, for instance, in a magnetooptical disk drive. In FIG. 1, reference numeral 10 denotes a light generator. Reference numeral 20 denotes a light emitting portion. Reference numeral 30 denotes a light detecting portion. Reference numeral 40 denotes an optical disk which is a recording medium. Reference numeral 50 denotes a conveyer for conveying light emitting portion 20 to search for information on the optical disk 40.

The light generator 10 of the present invention is composed of a lamp 11 for general illumination, a reflecting member 12 for converging the light of lamp 11 and having a reflecting surface 12a enclosing lamp 11, a hole plate member 13 blocking the front of reflecting member 12 and having a very small pinhole 13a on the center of the hole plate member, and a color filter 14 attached to the front surface of hole plate member 13.

Here, the reflecting surface 12a of reflecting member 12 is an elliptical surface geometrically having two focal points. The first focal point of the oval surface is adjusted to the emission center of lamp 11. The second focal point is adjusted to pinhole 13a of hole plate member 13. Most of the light radiated from lamp 11 in any direction is reflected from reflecting surface 12a of reflecting member 12 and converged on pinhole 13a of hole plate member 13 located in front of the lamp. The converged light is radiated toward the front from pinhole 13a at a predetermined radiation angle. Hole plate member 13 filters the spatial frequency of light using pinhole 13a, thereby improving temporal coherence. Specifically, by doing this, though two light beams pass pinhole 13a at a different time, when the two light beams, which will have different paths, together reach a component or target, they have a coherence as good as if the light waves are of a single wavelength.

Meanwhile, color filter 14 selectively transmits only a specific wavelength of the light through pinhole 13a, to improve spatial coherence. In other words, the color filter functions so that the wave planes of a light beam coincide to enhance the coherence between two light beams, one of which proceeds in the direction of the waves and the other of which proceeds in a direction perpendicular thereto.

As an alternative means for converging the light of lamp 11 on the pinhole 13a of hole plate member 13, the reflecting surface 12a may be formed to be parabolic or hemispheric instead of being elliptical, and a convex lens is provided in an appropriate location.

Figure 2:
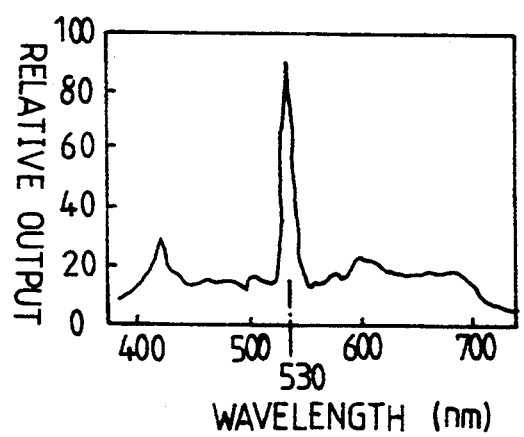
FIG. 2 is a graph for showing the spectral distribution characteristic of a metal halide lamp containing dysprosium-thallium (Dy-Tl).

The lamp 11 is, for instance, a metal halide lamp containing dysprosium-thallium (Dy-Tl). Despite of the difficulty of practical use, another lamp having a spectral distribution characteristic spectral to the metal halide lamp, such as a high-pressure mercury lamp, may be taken into consideration. The spectral distribution characteristic of the Dy-Tl containing metal halide lamp is shown in FIG. 2. In the graph of FIG. 2, the Dy-Tl containing metal halide lamp has a high light intensity around 530 nm (green light). The spectral distribution characteristic is similar to the distribution of a laser beam used mainly in optical recording fields. To select the light of this area, color filter 14 is selected.

Light emitting portion 20 consists of a condensing lens 21 and diverging lens 22 which reconverge the light radiated from light generator 10 at a predetermined radiation angle and from the converged light into a slim beam, a light modulator 23 for modulating the beam according to desired information, a diffusing lens 24 and collimating lens 25 for diffusing the modulated beam and making it parallel, a polarized beam splitter 26 for separating the reflected beam of optical disk 40 from a beam incident on the optical disk, a reflector 27 for reflecting the incident beam toward optical disk 40, and an objective lens 28 for converging the incident beam onto optical disk 40.

Here, light modulator 23 switches the incident beam at high speed, for instance, with a supersonic wave signal. The light modulator is added because temporal high-speed switching of lamp 11 is difficult for light modulation during recording. However, the lamp itself can module the light to some extent, and a lamp with high-speed switching is expected to be proposed in the near future. In this case, the additional light modulator is not required.

Light detector 30 includes prisms 31, 32, and 33 for resplitting the reflected beam split by polarized beam splitter 26 into two beams, and light detectors 34, 35, and 36 for detecting an electrically reproduced signal, a track error signal, and a focus error signal, from the split beams.

In the figure, the optical pickup of the present invention is shown as a so-called separation type in which the reflector 27 and objective lens 28 of light emitting portion 20 are mounted, for instance, on a carriage 51 of a conveyer 50 such as a voice coil motor, so as to be conveyed within the radius of optical disk 40. However, the present invention is not limited by the type of the optical pickup or the components of the respective portions. In the present invention, various modifications are possible within the scope of the claims. Further, the present invention can be modified for use in various systems for recording and reproducing information by using light or processing information, similar to the above, as well as recording and reproducing with respect to an optical disk.

In the configuration of the optical pickup for recording and reproducing for such an optical system of the present invention, a general lamp for radiating light over a wide range of wavelengths is used as a light source instead of a conventional laser apparatus so that light having excellent temporal and spatial coherence is selected to enable substantial optical recording and reproducing. Therefore, the present invention is simplified as compared with the conventional laser apparatus, and can form a small light source of short wavelength. Furthermore, the present invention accomplishes an incomparable cost saving innovation.

What is claimed is:

1. An optical pickup comprising:
   a light generator;
   a light emitting portion for convergently emitting light generated by said light generator onto a recording medium; and
   a light detector for detecting the light reflected from the recording medium to output an electrical signal, wherein said light generator comprises a lamp for radiating light, means for converging the light generated from said lamp to a point, a hole plate member having a pinhole for transmitting the light converged to the point, and a color filter located adjacent said hole plate member for selectively transmitting a predetermined wavelength of the light passing through the pinhole.

2. The optical pickup as claimed in claim 1 wherein said converging means comprises a reflecting member having an elliptical reflecting surface and first and second focal points for reflecting light radiated by said lamp, wherein the first focal point is located at a center of said lamp and the second focal point is located at the pinhole.

3. The optical pickup as claimed in claim 1 wherein said converging means comprises a reflecting member having one of a parabolic and hemispheric reflecting surface for reflecting light radiated by said lamp, and a lens element having a focal point for converging light reflected from said reflecting surface, wherein the focal point of said lens element is located at the pinhole.

4. The optical pickup as claimed in claim 1 wherein said lamp radiates light having a wavelength of around 530 nm.

5. The optical pickup as claimed in claim 1 wherein said lamp is a metal halide lamp containing dysprosium-thallium.

6. The optical pickup as claimed in claim 1 wherein said color filter transmits light having a wavelength around 530 nm.

7. The optical pickup as claimed in claim 1 wherein said light emitting portion comprises a light modulator for modulating light radiated by said light generator.

* * * * *